INVENTORS
MUNRO K. HAYNES
LOUIS A. RUSSELL
HERBERT K. WILD
BY Paul M Enlow
ATTORNEY

United States Patent Office 3,019,419
Patented Jan. 30, 1962

---

3,019,419
ELECTRICAL SWITCHING AND CONTROL APPARATUS
Munro K. Haynes and Louis A. Russell, Poughkeepsie, and Herbert K. Wild, Wappingers Falls, N.Y., assignors to International Business Machines Corporation, New York, N.Y., a corporation of New York
Filed Dec. 18, 1957, Ser. No. 703,583
8 Claims. (Cl. 340—174)

This invention relates to electrical switching, storage and logical circuitry apparatus and more particularly to such systems employing magnetic devices for executing switching, storage and logical operations.

The prior art includes single and multi-apertured cores for use in switching, storage and logical operations. Some of these cores are capable of storing a single bit of information, whereas others are capable of storing a plurality of such bits. In the cores capable of storing a plurality of bits, it was required that a plurality of apertures be provided for storing each bit. Such cores, however, are not suited for use in complicated switching arrangements due to the elaborate input and output windings required. Furthermore, such cores may be switched whenever suitable impulses are applied to the input windings thereof since there is no provision for controlling the flux path of the entire core. Two-apertured cores have been proposed wherein the flux pattern adjacent a single aperture is used to store a bit of information or effectuate a switching function. In the latter type, each core accommodates only a single bit or a single switching channel. Some of the cores of the prior art are provided with means for rendering the core insensitive to input signals except when a predetermined condition is established in the core. However, these cores are capable of controlling the flux pattern required to accommodate only a single bit of information or a single switching channel.

The present invention provides a novel switching device for accommodating a plurality of input signals selectively or simultaneously, whereby the input signals may be selectively transferred and/or stored during the transmission thereof between a plurality of input or output terminals, and wherein the entire core can be conditioned for operation or reset to an Off state.

The present invention provides a basic switching, storage and logical element in the form of a multi-apertured magnetic core which may be used as a building block in forming elaborate switching and storage matrices. By arranging a plurality of the novel cores in a matrix having a plurality of input and output terminals, and further by providing coordinant selection control means common to particular groups of cores, information signals applied to one or more of the input terminals can be stored or can selectively be switched to one or more of the output terminals. The novel switching arrangement can be utilized to perform basic switching operations of the type associaed with crosspoint type switches. The invention also can be operated as a serial-to-parallel or parallel-to-serial conversion unit, as a branching circuit, or to perform logical mixing functions as an OR circuit. The invention may also be used as an intermediate storage register which combines storage functions with switching, conversion, mixing and branching functions noted above. The novel switching circuit accommodates discrete pulses, A.C. signals or modulated signals.

The multi-apertured core of the invention is fabricated from a magnetic material having a substantially rectangular hysteresis curve. The core defines a main aperture, one or more selection apertures and a plurality of signal or switching apertures arranged about the main one. The core thus provides a long or major flux path throughout the entire core and also a plurality of shorter or minor flux paths each adjacent and surrounding the periphery of a signal aperture.

A plurality of selection windings are provided, a first one of which embraces the entire main flux path, and one or more others which embraces only a portion of the main flux path. The core may be reset to the Off state, a saturation remanent condition where the direction of the flux is uniform throughout the main path. The core is Off when the direction of the flux is clockwise, for example, throughout the whole core. The application of a half select pulse to only one of the selection windings creates an mmf. which is ineffective to produce flux reversal in the core. However, the coincidental application of half select pulses to a plurality of selection windings turns the core On by effectuating a flux reversal in the core material thus establishing a localized flux pattern adjacent an aperture embraced by at least one of the selection windings. The localized flux pattern causes the flux in the remaining portion of the core to form a kidney shaped pattern.

Once the core is turned On, the flux surrounding any of the signal apertures may be controlled to perform switching and storing functions. Each of the signal apertures is provided with one or more drive and output windings. The application of a suitable pulse to a drive winding when the core is Off, is ineffective to materially alter the flux pattern adjacent the signal aperture. When the core is On however, the energization of one or more of the drive windings produces an mmf. which reverses the direction of the flux adjacent the aperture thereby inducing an output signal in the output winding. The flux reversal around the particular signal aperture may be used as an indication of the storage of a bit of information or may be used as a switching means for producing a pulse in the output winding indicative of the application of an input pulse which was applied to the drive winding. The application of a resetting pulse to a drive winding associated with the particular signal aperture reverses the flux to its original direction thereby inducing an output signal having a polarity opposite to the output signal previously induced therein. The output signal may be discriminated against by suitable polarity sensitive circuitry connected to the output winding or alternatively may be utilized as an indication that a bit of information was read out from the signal aperture.

The signal apertures may be arranged in any manner throughout the core so long as adjacent apertures are sufficiently displaced from each other so as to preclude interference between the flux patterns associated with each aperture.

A plurality of multi-apertured cores disclosed herein may be arranged in a variety of switching arrangements to perform switching, logical and storage functions. Cores may be arranged in a matrix having rows and columns whereby the selection windings of all of the cores in each row and all of the cores in each column are common. Each of the rows may be provided with a plurality of drive windings where each drive winding embraces a particular signal aperture of each core in the row. Additionally, each of the cores in a column may be provided with a plurality of output windings wherein each output winding is common to a particular aperture of each of the cores in the column. By appropriately controlling the coordinant matrix selection windings, information pulses applied to particular drive windings may be stored in particular cores or alternatively may be used to induce output signals in predetermined output windings of particular cores. Where the storage function of the cores is utilized, representations of information pulses applied to the drive windings may be stored in the various cores in any order taking advantage, if necessary, of the ability of the system to rearrange the order of the information pulses when representations thereof are stored. Thereafter, the cores may be selectively read out to provide manifestations of the input pulses, serially or in parallel, in any desired order. Thus the system may be utilized, for example, to transpose representations of binary bits of a word of information when the word is transmitted through the switch.

Accordingly, it is a principal object of the present invention to provide a novel switching device having a plurality of input and output means and defining a plurality of magnetic flux paths, whereby transmission and/or storage of a plurality of electrical signals therethrough is performed by controlling the direction of flux in one or more of said paths.

Another object is to provide a novel switching arrangement employing multi-path magnetic cores.

Another object is to provide a novel multi-apertured magnetic core for storing a plurality of bits of information, each bit requiring a single aperture, and means controlling the operability of all signal apertures of said core.

A further object is to provide a novel magnetic core for selectively switching a plurality of electrical channels.

A further object is to provide a switching device for use in a switching matrix, each said device having On and Off states, and further each said device being provided with a plurality of switching means capable of being selectively operated individually only when said device is On.

An additional object is to provide a novel device for performing logical functions whereby the simultaneous energization of a first plurality of inputs (AND functions) conditions the device to permit the effectuation of the logical OR function by transmitting any of a second plurality of input signals to an output terminal.

It is also an object to provide a novel crosspoint type switch having a plurality of input and output terminals and employing a plurality of multi-path magnetic cores in an arrangement whereby signals applied to one or more of said input terminals can be manifested selectively at one or more of said output terminals.

Another object is to provide a novel switching device employing magnetic cores for transmitting pulse and/or modulated signals between a plurality of input and output channels, each said core accommodating a plurality of channels.

Another object is to provide a novel magnetic system effectuating switching and storage functions of a plurality of signals between one or more input and output circuits.

It is also an object to provide a novel multi-path core capable of switching and storing representations of a plurality of electrical signals simultaneously.

Additionally, an object is to provide a novel multi-path core defining a selection aperture and a plurality of signal apertures.

It is also an object to provide a novel magnetic core defining first and second flux paths, a first input means coupled to said first path and a second input means coupled to both said paths, whereby the application of a half select pulse to said first input means embraces only said first path and the application of a half select pulse to said second input means embraces both said paths, but the simultaneous application of half select pulses to said first and second input means being required to alter the direction of flux in either path.

Other objects of the invention will be pointed out in the following description and claims and illustrated in the accompanying drawings, which disclose, by way of example, the principle of the invention and the best mode, which has been contemplated, of applying that principle.

In the drawings:

FIG. 10 shows figure 8 type windings as used with the invention.

Figure 2:
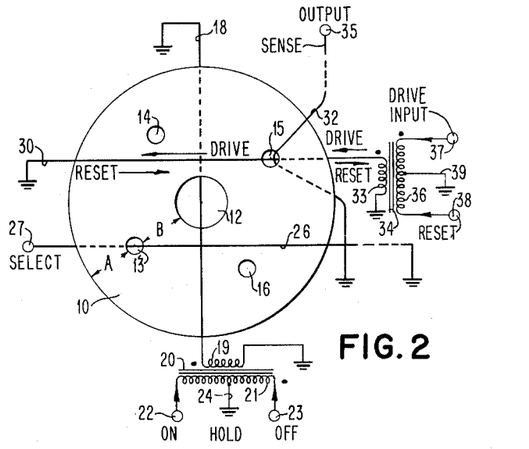
FIG. 2 illustrates a multi-path magnetic core employed in the invention.

*Switching and storage unit—FIG. 2*

In the description of the present invention and in the drawings, a winding is shown and described as passing through an aperture in the core material. It is to be understood however, that the invention is not restricted to the application where an aperture in the material must be provided. For example, where the core material is molded around the conductors comprising the windings, the term "aperture" includes the volume occupied by the conductor. Furthermore, the term "aperture" is also applicable to the volume occupied by a conductor where the winding is molded completely within the core material.

Figure 1:
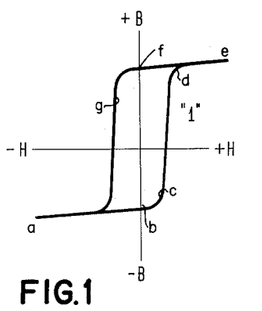
FIG. 1 is a graph showing a typical hysteresis curve of a magnetic material used to practice the invention.

FIG. 2 illustrates a first embodiment of the invention which includes a multi-apertured core 10 and the associated operating windings. Although a toroidal core is illustrated in FIG. 2, the invention is not limited thereto and may include other shapes as will be shown hereinbelow. The core 10 may be fabricated of any material exhibiting a substantially rectangular hysteresis characteristic of the type depicted in FIG. 1, as for example, an Mg—Mn ferrite. The core 10 and the apertures therein may be molded by suitable die techniques, or punched, cut or drilled from a sheet of suitable material, or may be fabricated by spraying, evaporating or plating a thin film of magnetic material on an appropriate backing substance.

The core 10 of FIG. 2 defines a main aperture 12 which, in the toroidal embodiment, is preferably located in the center of the core. The core is also provided with a plurality of additional apertures 13, 14, 15 and 16 which are utilized as "selection" and "signal" apertures. Although only four such apertures, 13–16, are shown in FIG. 2, it is to be understood that additional "signal" apertures may be provided where required, as described hereinbelow.

The apertures 13–16 are each arranged so that the cross-sectional area of the path A is equal to the cross-sectional area of path B. Thus, in the toroidal embodiment of the invention wherein the apertures are circular, the distance between the center of apertures 13 through 16 and the center of aperture 12 is uniform and the center of apertures 13 through 16 are located midway between the inner and outer core surfaces. The foregoing statement assumes that the core is of substantially uniform thickness.

It will be shown hereinafter that aperture 13 is the selection aperture which is used to establish the proper flux pattern throughout the core so that the flux patterns surrounding the signal apertures may thereafter be selectively altered.

Aperture 12 of the multi-path core 10 is provided with a winding 18 which is referred to hereinafter as the "hold" winding. The hold winding 18 passes through main aperture 12 and is connected between a ground return and a suitable signal source such as winding 19 of transformer 20. The other terminus of winding 19 is connected to the ground return. The primary winding 21 of transformer 20 is connected between terminals 22 and 23 and is provided with an intermediate tap 24 which is connected to ground.

Figure 3:
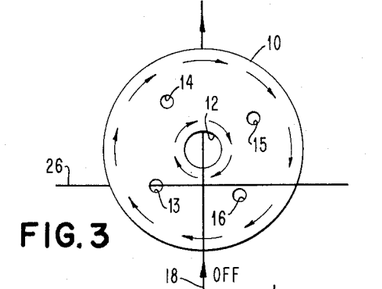
FIG. 3 depicts the flux pattern of a core in the Off state.

Terminal 22 is referred to as the On terminal, and terminal 23 is referred to as the Off terminal. A full-select pulse sufficient to switch the flux throughout the entire cross section of the core of appropriate polarity is applied to Off terminal 23 to provide a curent flowing in winding 18 in a direction from winding 19 upward through winding 18 to ground. The Off current flowing in winding 18 due to the Off pulse applies an mmf. to the core sufficient to establish a flux therein which saturates the core in one direction. Since the Off current flows upwards through winding 18, the core is saturated by flux having a clockwise direction as shown in FIG. 3. Note that the flux in both the inner and outer portions of the core is in a clockwise direction. Upon the cessation of the full-select, Off pulse, the value of "H" of FIG. 1 becomes zero and the material subsides to a remanent state on the vertical "B" axis. The flux pattern illustrated in FIG. 3 remains, and the core is said to be unselected or Off.

Selection aperture of FIG. 2 is provided with a select winding 26 which passes therethrough and is connected between the select terminal 27 and ground. Briefly, the core 10 is placed in the selected or On condition by coincidentally applying half-select pulses of the proper polarity to the select terminal 27 and to the On terminal 24.

The application of a half-select pulse to terminal 27 causes a current to flow in winding 26 from terminal 27 toward ground, which creates an mmf. $H_1/2$ in leg A having a direction counterclockwise around aperture 13. However, it should be understood that a half-select current in winding 26 is insufficient, by itself, to alter the Off flux pattern of FIG. 3. The application of a half-select, On pulse to terminal 22 (FIG. 2) produces a half-select current in winding 18 which flows downward therein from ground toward winding 19 of transformer 20. The half-select current in winding 18 creates an mmf. $H_2/2$ in leg A having the same sense or direction as the mmf. due to the select current flowing in winding 26. The mmf. applied to leg B by the On current in winding 18 has a direction in opposition to the mmf. created by the selection current in winding 26. Hence, the respective mmf.'s $H_1/2$ and $H_2/2$ are additive in leg A, but are in opposition in leg B and thus tend to cancel.

Figure 4A:
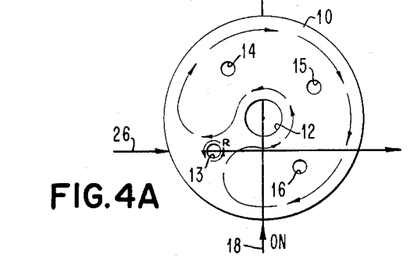

Since the respective currents flowing in windings 18 and 26 are each half-select currents, the respective mmf.'s $H_1/2$ and $H_2/2$ produced thereby in leg A combine to provide a full-select force equal to H. The direction of this full-select force in leg A is in opposition to the direction of the remanent mmf. therein (see FIG. 3) previously subsisting in the Off state. Thus, the full-select mmf. in leg A produced by the selection and On currents switches or alters the flux pattern throughout the core so as to establish a localized closed path around opening 13 and a so-called "kidney" shaped pattern in the remainder of the core, as is illustrated in FIG. 4A. Upon the establishment of the flux pattern of FIG. 4A, the core 10 of FIG. 2 is said to be selected or On.

While no attempt is made herein to describe the exact flux pattern established throughout the multi-path core, the pattern of FIG. 4A is representative of the pattern in a selected core. The flux pattern of FIG. 4A may also be illustrated for purposes of explanation by the diagram shown in FIG. 4B. That is, the direction of the flux adjacent corresponding portions of each of the apertures is the same in FIGS. 4A and 4B. Theoretically, the flux line pattern of FIG. 4A more accurately depicts the On condition of the core. The flux pattern of FIGS. 4A or 4B remains after the cessation of the selection and the On currents in windings 26 and 18, respectively.

Figures 1O, 4B:
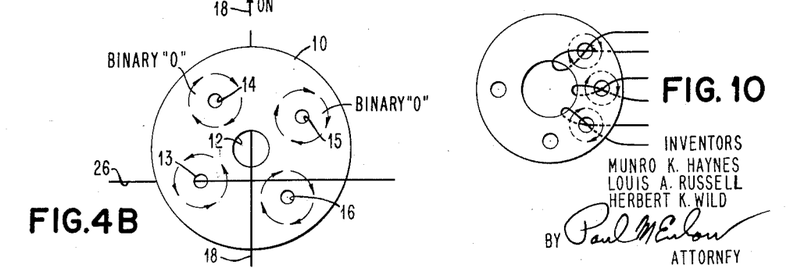
FIGS. 4A and 4B illustrate the flux pattern of a core in the On state.

Summarizing briefly, a multi-path core is said to be Off when flux throughout the core is in a predetermined direction as shown in FIG. 3. The core is said to be On or selected when a flux pattern such as is shown in FIGS. 4A or 4B is established therein. It is to be understood however, that if the direction of the currents described hereinabove are each reversed, the direction of the flux lines will be reversed with respect to the directions illustrated in FIGS. 3, 4A and 4B.

If desired, the core of FIG. 2 may be operated with half-select pulses applied to two windings threaded through aperture 13. A multiple input selection circuit can be utilized as, for example, where two windings through aperture 13 and one around the entire core, or vice versa, are employed.

As stated previously, each of the remaining apertures 14, 15 and 16 is referred to as a signal aperture. In order to simplify the explanation of the operation of the multi-path core of FIG. 2, the windings normally associated with each signal aperture are shown only with respect to signal aperture 15. Signal aperture 15 is provided with a drive winding 30 and a sense (output) winding 32, each threaded therethrough. The drive winding 30, is connected between ground and a suitable current pulse source such as the secondary winding 33 of transformer 34. The sense winding 32 is connected between output terminal 35 and the ground return path.

The core of FIG. 2 may be provided with a separate sense winding 32 for each of the signal apertures or where required, a common sense winding embracing one or more of the signal apertures may be used. Also, each of the signal apertures may be provided with a plurality of drive windings which must be operated in coincidence in order to switch the direction of the flux associated with an aperture. In the latter instance, a particular drive winding may embrace one or more signal apertures to provide a system whereby a predetermined combination of drive inputs is required to switch the flux associated with one or more signal apertures. In this manner, the signal apertures may be employed to perform logical AND, or logical OR functions.

As shown in FIG. 2, transformer 34 is provided with a primary winding 36, the extremities of which are respectively connected to terminals 37 and 38. An intermediate tap 39 of winding 36 is connected to ground. Thus, the application of pulses having a predetermined polarity to input terminal 37, for example, creates a current in drive winding 30 which flows in a first direction. However, the application of a similar pulse to reset terminal 38 creates a current in winding 30 which flows in a second or opposite direction.

The device of FIG. 2 may be thought of as a master switch which in turn controls a plurality of individual switches or switch points. The master switch must be turned On before any of the individual switches may be operated. Once the core is turned On by the coincidental half-select pulses applied to windings 18 and 26 as described previously, any of the signal apertures (such as 14—16) may be operated as individual switches to switch an input signal from an input terminal to an output terminal. By disengaging the master switch (turning the entire core Off), each of the individual switches analogous to the signal apertures 14—16 are rendered inoperative.

Figure 5:
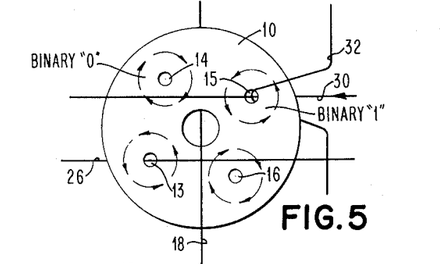
FIG. 5 illustrates the flux pattern of a core that is On and wherein the flux adjacent a signal aperture has been reversed.

Assuming that the core of FIG. 2 is On, the application of an input pulse of suitable polarity to terminal 37 of FIG. 2 produces a drive current in winding 30 which flows left from winding 33 toward ground, as shown. The drive current produces a counterclockwise mmf. around aperture 15 which reverses the direction of only the flux immediately encompassing this aperture as shown in FIG. 5. The input pulse (drive current) must be of sufficient amplitude to reverse the direction of the flux around aperture 15, but of insufficient amplitude to materially affect a core which is Off.

The flux reversal around aperture 15 induces a voltage pulse of a first polarity in sense winding 32. This voltage pulse may be utilized by circuitry connected to terminal 35 as an indication that aperture 15 was previously storing a binary 0, or as an indication that an input pulse was applied to terminal 37, or, alternatively, it may be discriminately ignored.

The resultant flux pattern near aperture 15 depicted in FIG. 5 may be returned to the pattern shown in FIG. 4A or 4B by applying a reset pulse of suitable polarity to terminal 38 of FIG. 2. The reset pulse produces a reset current in winding 30 which flows to the right from ground towards winding 33 as indicated. The flux reversal around aperture 15, which is caused by the reset pulse, induces another voltage pulse of a second or opposite polarity in sense winding 32. The latter voltage pulse may be utilized as an indication that aperture 15 was previously storing a binary 1, or that an input pulse was previously applied to input terminal 37, or the pulse may be ignored as being merely the consequence of a resetting operation.

For example, consider that the device of FIG. 2 is being employed as a switching element to selectively switch pulses between input terminal 37 and output terminal 35. In this application a core, which is originally Off (FIG. 3), is selected by simultaneously applying On and select pulses to terminals 22 and 27, respectively. This turns the core On (FIG. 4A or 4B). Thereafter, if an input pulse is applied to terminal 37, the flux around aperture 15 is reversed and an output pulse of one polarity is manifested at terminal 35. At the completion of the operation a reset pulse is applied to terminal 38 which alters the flux pattern of FIG. 5 to that of FIG. 4A or 4B. The output signal produced during the reset operation could be ignored, if desired.

It is apparent that the device of FIG. 2 basically performs a logical AND function which in turn controls a plurality of OR functions. In other words, the hold conductor 18 and the select conductor 26 may be conjointly operated as an AND circuit to turn On the core. Thereafter, the flux adjacent any of the signal apertures may be switched to facilitate the effectuation of further logical functions. For example, by utilizing a sense winding which is common to each of the signal apertures of a particular core, the logical OR function is performed since the application of an input signal to any of the drive conductors similar to conductor 30 associated with signal apertures 14—16, produces an output pulse in the common sense winding.

Consider, as a further example, that the core of FIG. 2 is to be used as a combination switch and storage device to provide a delay between input and output signals. In this instance, a particular core is turned On, and thus selected in the manner described above, thereby exhibiting the flux pattern of FIG. 4A or 4B. The direction of the flux around aperture 15 of FIG. 4A or 4B is arbitrarily said to represent the storage of a binary 0 bit of information. In order to initially store a representation of a binary 1 bit, a pulse is applied to input terminal 37 (FIG. 2). The effect of the input pulse is to reverse the flux around aperture 15 to establish the pattern of FIG. 5. The core is then said to be storing a representation of a binary 1 at aperture 15. The pulse produced in the output winding 32 as a result of the flux reversal during the storage of the binary 1 is ignored, as is usually the case in core memory systems. At a later time, the information stored at aperture 15 is read out by applying a pulse to terminal 38. This pulse produces a reversal of the flux around aperture 15 to re-establish the flux in the direction depicted in FIG. 4A or 4B. The latter reversal induces a voltage pulse in output winding 32 which indicates that a binary 1 had been stored in the core. It is to be appreciated that if the core were storing a representation of a binary 0 at the instant the pulse was applied to terminal 38, an output signal would not be manifested in winding 32 since a flux reversal would not transpire.

Similarly, information can also be stored by controlling the flux around each of the apertures 14 and 16 by employing separate drive windings. A plurality of cores may be operated in the manner described to form a combination multi-position switch and register.

Figure 6:
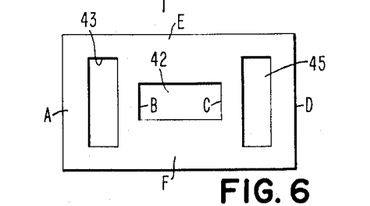
FIG. 6 shows an alternative arrangement of a multi-path core which may be employed in the invention.

Illustrated in FIG. 6 is a rectangularly shaped core having apertures 42, 43 and 45 which may be utilized in the same manner described hereinabove with respect to the device of FIG. 2. The aperture 43 may be provided with the windings illustrated in FIG. 2 and utilized as the selection aperture; by providing a Hold winding through aperture 42 the function attributed to aperture 12 of FIG. 2 is afforded; and by linking leg D through aperture 45 with suitable drive and sense windings, the flux pattern around aperture 45 provides the same results as those obtained with aperture 15 of FIG. 2. Assuming that the magnetic material comprsiing the core of FIG. 6 is substantially uniform in thickness, the width of the pair of legs A and B, as well as the widths of the pair C and D, are generally made equal. Also, the widths of legs E and F are each made equal to the combined widths of either pair A and B or C and D.

It is obvious that further embodiments of the rectangularly shaped core can be constructed in accordance with the invention by placing additional apertures above and below aperture 42. The number of apertures which may be utilized in the embodiments of FIGS. 2 and 6, have no inherent theoretical limit, but practically the number may be limited by the driving currents, the size of the coil, and the additive effects produced when the flux surrounding several apertures are switched simultaneously.

Figure 7:
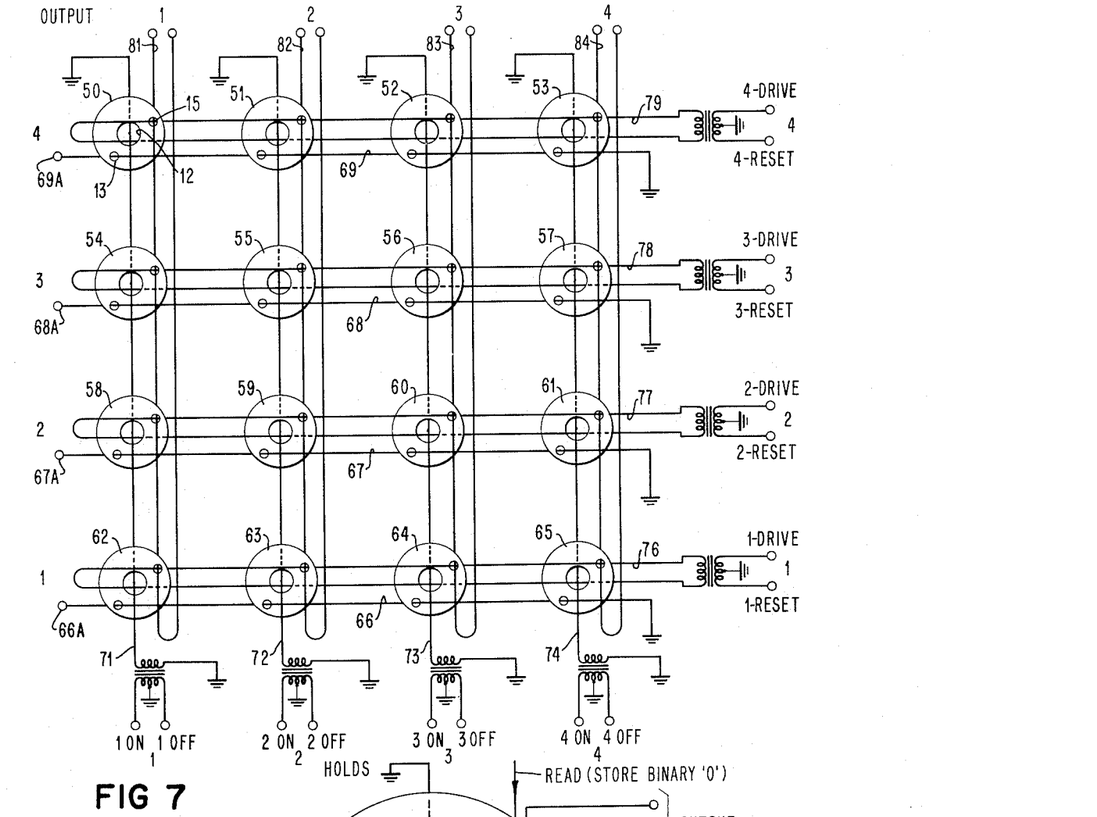
FIG. 7 is a schematic diagram of a first embodiment of the invention employing multi-path cores of the type shown in FIG. 2.

Crosspoint switch—FIG. 7

Referring more particularly to FIG. 7, a crosspoint type of switch utilizing the device of FIG. 2 is illustrated. In order to simplify the drawing, each core is illustrated with a single signal aperture 15. It should be understood however, that in a more complex embodiment, additional signal apertures could be used thereby providing additional channels for the transmission and switching of pulse information.

The crosspoint switch of FIG. 7 includes cores 50–65 which are arranged in rows 1–4 and columns 1–4. Each of the rows is provided with a select winding which embraces the selection apertures 13 of each of the cores in that row. The selection windings 66—69 each are utilized in a manner described hereinabove with respect to winding 26 of FIG. 2. Winding 66, for example, embraces selection aperture 13 of each of the cores 62—65. The windings 66—69 would be connected to suitable pulse circuitry for providing appropriate selection pulses, each pulse being a half-select pulse.

The columnar selection of the various columns of cores is facilitated by the provision of Hold windings 71—74. Each of the Hold windings embraces the main aperture 12 of each of the cores in a given column. For example, Hold winding 71 of FIG. 7 is coupled to each of the cores 50, 54, 58 and 62 through the respective main apertures 12 thereof. In order to select (turn On) a particular core, suitable selection and On pulses must be respectively applied to the selection and Hold windings associated with the desired core.

For example, assuming that all of the cores of FIG. 7 are initially Off and thus exhibiting the flux pattern of FIG. 3, the application of a pulse to the 2-On terminal associated with Hold winding 72 conditions each of the cores 51, 55, 59 and 63 of the second column. A particular one of the cores in the second column may be then selected by applying a select pulse to the appropriate select winding. The application of a select pulse to terminal 67A, for example, causes core 59 to be turned On as a result of the coincidence of a half-select pulse on winding 67 and a half-select pulse on winding 72. The flux pattern illustrated in FIG. 4A or 4B is then established in core 59.

Thereafter, the direction of the flux encompassing aperture 15 of core 59 may be switched in the manner described hereinabove with respect to FIG. 2.

More particularly, corresponding signal apertures of the cores of each of the rows are provided with a drive and reset winding, such as windings 76—79 of FIG. 7. These windings 76—79 are used in the same manner as winding 30 of FIG. 2. Corresponding signal apertures of the cores of each column are provided with a common sense winding such as the individual windings 81—84. Sense winding 81, for example, embraces cores 50, 54, 58 and 62.

Continuing the example recited above wherein core 59 was turned On and thus portrays the flux pattern of FIG. 4A or 4B, the application of an input pulse to the drive input (2-Drive) of the second row produces a drive current in winding 77 which is applied to aperture 15 of each of the cores 58, 59, 60 and 61. Since only core 59 has previously been turned On, the current in winding 77 is able to switch the direction of the flux surrounding aperture 15 of core 59. The flux pattern adjacent each of the apertures 15 of cores 58, 60 and 61 is not altered.

The flux reversal associated with aperture 15 of core 59 induces a signal in sense winding 82 which may be utilized as an output signal indicative of the fact that a pulse was applied to the drive input terminal associated with the second row. Thereafter, the flux pattern of FIG. 4A or 4B may be re-established in each of the cores by applying a pulse to each of the Reset terminals associated with rows 1–4 of FIG. 7.

The crosspoint type switch employing magnetic cores of FIG. 7 may also be operated in a manner whereby an input pulse may be applied to a designated drive winding associated with one of the rows and appear at one or more of the output windings associated with the various columns. In this instance, a selection pulse is applied to only one of the select windings during the receipt of each input pulse, thereby conditioning each of the cores in a given row. Thus, by applying a plurality of input pulses occurring serially to a designated drive winding, these pulses may be stored in the row of cores associated with the drive winding. Thereafter, all of the cores of the row may be read out simultaneously to complete the serial-to-parallel conversion operation.

First consider the situation where a single input pulse is converted to a plurality of output signals. For example, assume that a select pulse is applied to select winding 67 whereby each of the cores 58–61 are conditioned. The application of On pulses to one or more of the On inputs select one or more of the cores in the second row. For example, assume that On pulses are applied to the system whereby an On current flows in each of the windings 71, 73 and 74. The coincidence of the On and select currents in the windings associated with cores 58, 60 and 61 causes these cores to be turned On, whereby the flux pattern of FIG. 4A or 4B is established in each of them. Thereafter the application of an input pulse to the 2-Drive input terminal causes a drive current to flow in winding 77, thereby switching the flux around each of the apertures 15 of cores 58, 60 and 61. The reversal of the flux pattern in the designated cores causes an output pulse to be manifested in sense windings 81, 83 and 84 simultaneously. At the conclusion of the operation, a reset pulse can be applied to the Reset terminal associated with each of the rows, thereby re-establishing the flux pattern of FIG. 4A or 4B in cores 58, 60 and 61. In order to turn cores 58, 60 and 61 Off, it is necessary to thereafter apply an Off pulse to each of the terminals 1-Off, 3-Off and 4-Off.

In a like manner, a first input pulse applied to the 2-Drive after core 58 is turned On may be stored therein. Thereafter, core 59 is turned On, and a second input pulse at the 2-Drive input stored in core 59. Similarly, additional pulses applied serially to the 2-Drive input can be stored in cores 60 and 61. After all the input pulses have been received and stored, cores 58–61 may be read out simultaneously to complete the serial-to-parallel conversion operation.

From the above description, it is clear that the circuitry of FIG. 7 may be operated to perform a serial-to-parallel conversion. It will be indicated hereinbelow that the circuitry of FIG. 7 may also be used to perform a parallel-to-serial type of conversion. The conversion operations referred to are of the type normally encountered in computing apparatus, as for example, where information appearing simultaneously, i.e., in parallel form, is converted to a serial representation wherein the pulses appear serially on a single output lead.

By energizing a single Hold winding associated with a predetermined column and simultaneously energizing one or more select windings associated with one or more rows, a plurality of cores in a single column are turned On. Thereafter, the circuitry of FIG. 7 may be operated in an application whereby a plurality of input pulses applied to one or more of the drive input windings associated with the various rows may be manifested at a single output terminal of a particular column.

For example, assume that all of the cores of FIG. 7 are initially Off. The application of an On pulse to the second column causes an On current to flow in winding 72, thus conditioning each of the cores 51, 55, 59 and 63. The simultaneous application of select pulses to select windings 66, 68 and 69, for example, during the same interval that current is flowing in winding 72, causes each of the cores 51, 55 and 63 to be turned On. Thereafter, the application of an input pulse to the 1-Drive input terminal produces a current in winding 76 which reverses the flux around aperture 15 of core 63. This action produces an output pulse in sense winding 82. The application of an input pulse to the 3-Drive input terminal causes a drive current to flow in winding 78 which switches the flux around the aperture 15 of core 55 thereby producing another output pulse in sense winding 82. Similarly, the application of an input pulse to the fourth row causes a drive current to flow in drive winding 79 which switches the flux around aperture 15 of core 51 to produce a further output pulse in winding 82.

The cores 51, 59 and 63 are thereafter reset to the flux pattern illustrated in FIG. 4A or 4B upon the application of reset pulses to the Reset terminals associated with each of the rows. The flux pattern of FIG. 3 (Off state) may be re-established by applying an Off pulse to the second column to produce a full select Off current in winding 72.

Hence, it is seen that the circuitry of FIG. 7 may be used to provide output pulses on a single sense winding associated with a particular column as a result of the application of a plurality of pulses to the drive windings associated with various rows. It is to be appreciated that this operation may be characterized as the logical OR function or as a parallel-to-serial conversion.

Figure 8:
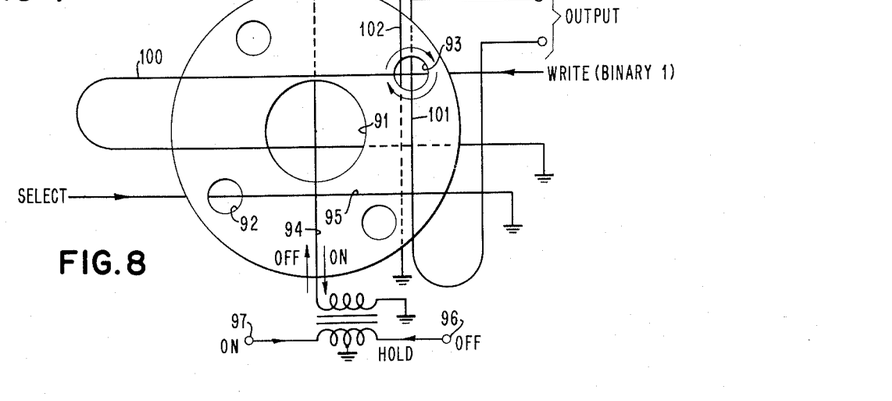
FIG. 8 illustrates another arrangement of the device of FIG. 2.

*Switching and storage—FIG. 8*

FIG. 8 illustrates a modification of the invention whereby the device of FIG. 2 is employed as a combination switch and storage unit. The core of FIG. 8 is provided with the same windings shown in FIG. 2, and additionally, a read winding is included. The purpose of the read winding is to provide a means for resetting a signal aperture (i.e., reverse the flux therearound) to read out any information stored therein, so that the readout means is independent of the means used to write information in the signal aperture.

Referring to FIG. 8, the core 90 defines a main aperture 91, a select aperture 92, and a signal aperture 93. Additional signal apertures may be provided as explained hereinabove. Aperture 91 is provided with a Hold winding 94 which passes therethrough. Select winding 95 passes through aperture 92.

The core of FIG. 8 is turned Off by applying a full select Off pulse to terminal 96. The pulse causes an Off current to flow in winding 94 thus establishing the unidirectional flux configuration of FIG. 3. Thereafter, the core is selected (turned On) by simultaneously creating half-select On and select currents in windings 94 and 95, respectively. The coincidence of half-select currents in windings 94 and 95 produces a conjoint mmf. which alters the flux pattern of the core to that of FIG. 4A or 4B.

A write winding 100 intersects signal aperture 93, and is used to switch the direction of flux around the aperture from the direction illustrated in FIG. 4A or 4B to that of FIG. 5. When the flux pattern of FIG. 5 is established, aperture 93 (corresponding to 15 of FIG. 5) is said to be storing a representation of a binary 1.

Aperture 93 is traversed by output winding 101 and read winding 102. Assuming that a binary 1 is being stored by aperture 93, the application of a pulse to read winding 102 reverses the flux around the aperture, thereby re-establishing the pattern of FIG. 4A or 4B. This flux reversal induces an output pulse in winding 101 which is indicative of the fact that a binary 1 was previously stored by aperture 93. The pulsing of read winding 102 of FIG. 8 thus produces the same result as the pulsing of the reset terminal 38 of FIG. 2.

Figure 9:
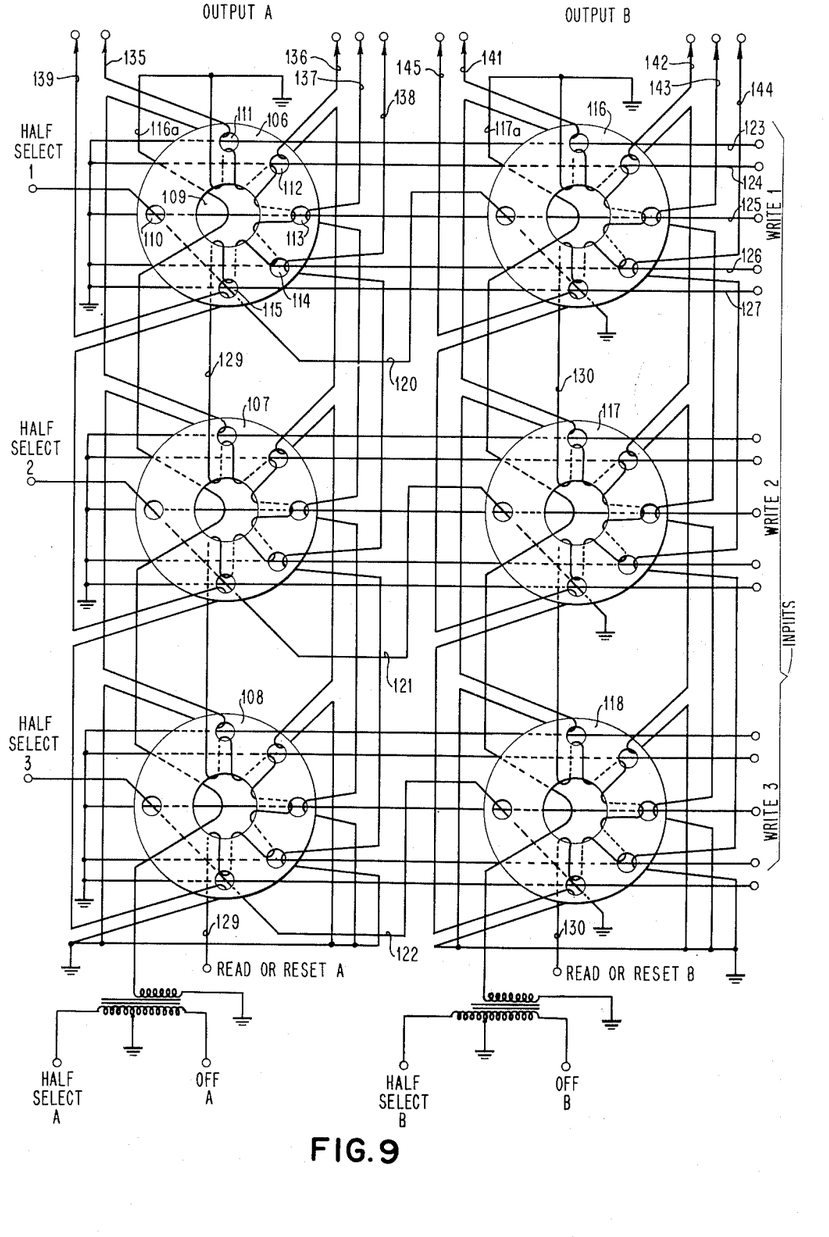
FIG. 9 is a schematic diagram of another embodiment of the invention for effecting switching, storage and logical operations.

The core of FIG. 8 may be provided with additional signal apertures to facilitate the construction of complex storage and switching circuitry of the type illustrated in FIG. 9.

Where it is desired to perform a logical AND function with relation to a particular signal aperture such as 93, the write conductor 100 may be replaced by one or more conductors which must be operated coincidentally in order to apply a sufficient mmf. to the core material surrounding the conductors to switch the direction of flux therein. So also the read winding 102 may be replaced by two or more conductors which must be operated conjointly to effect a flux reversal in the core.

Referring more particularly to FIG. 9, a matrix employing cores of FIG. 8 is illustrated. The cores of FIG. 9 are arranged in a plurality of rows 1–3 and columns A—B. Although FIG. 9 illustrates a 2 x 3 matrix, it is to be understood that additional cores may be employed in order to increase the size and capacity of the matrix. Cores 106, 107 and 108 are arranged in column A and cores 116, 117 and 118 are arranged in column B. Each of the cores includes a main aperture 109 (see core 106), a selection aperture 110, and a plurality of signal apertures 111–115. A common hold winding 116 embraces each of the cores 106–108 of column A. Hold winding 117 embraces each of the cores of column B.

Selection windings 120, 121 and 122 are provided which are respectively associated with the cores arranged in rows 1–3. Selection winding 120, for example, traverses the selection apertures 110 of each of the cores in row 1. A particular core of FIG. 9 is selected and thus turned On in the same manner as described hereinabove with respect to FIG. 7.

Since the circuits embracing the cores of each row are identical, the description herein is restricted to row 1. The manner of operating any particular core is, in each case, the same.

A write winding is provided for all of the corresponding signal apertures of each of the cores in a predetermined row. For example, write conductors 123, 124, 125, 126 and 127 pass through signal apertures 111–115, respectively, of each of the cores. The purpose of each of the write conductors 123–127 of FIG. 9 is similar to conductor 100 of FIG. 8. Information pulses applied to one or more of the write conductors of FIG. 9, are effected to alter the direction of the flux adjacent corresponding signal apertures.

A read or reset winding 129 embraces each of the signal apertures of each of the cores comprising column A. Similarly, conductor 130 is coupled through each of the signal apertures of the cores of column B. Conductors 129 and 130 of FIG. 9 are used to read out the information stored in the flux pattern adjacent the signal apertures by returning the flux pattern adjacent the signal apertures to that illustrated in FIG. 4A or 4B. Although a common read or reset winding is illustrated for each of the columns of FIG. 9, it should be understood that an individual read winding embracing corresponding signal apertures of each of the cores of a column may be provided if desired.

A plurality of output windings 135–139 are provided for column A which respectively embrace signal apertures 111–115. A similar group of output conductors 141–145 are provided for column B. Accordingly, the read out of a stored representation associated with any of the apertures 111 of cores 106–108 is manifested on conductor 135, for example, as a voltage signal.

Consider for example, that each of the cores of FIG. 9 are initially Off and thus are in the remanent state illustrated in FIG. 3. Core 106 of FIG. 9, for example, is selected by applying half-select pulses to each of the terminals half-select 1 and half-select A simultaneously. The remanent state of core 106 is altered to the flux pattern illustrated in FIGS. 4A or 4B and thus is said to be On.

Representations of information signals applied to any of the terminals 123–127 may now be stored in core 106. Assuming for example, that information pulses are applied to conductors 123 and 125, the direction of the flux adjacent apertures 111 and 113 of core 106 is reversed (see aperture 15 of FIG. 5) thereby storing representations of binary 1 bits.

The information stored in core 106 is read out by applying a pulse to conductor 129. The current flowing in conductor 129 tends to restore the direction of the flux adjacent each of the signal apertures of column A to the pattern depicted in FIG. 4A or 4B. Upon the reversal of the flux adjacent apertures 111 and 113, output signals are respectively induced in sense windings 135 and 137. In a similar manner, information signals applied to any of the input terminals depicted at the right-hand edge of FIG. 9 may be stored in predetermined cores and thereafter read out and manifested on the appropriate output terminals.

While the windings depicted in FIGS. 2–5 and 7–9 are indicated as a single turn, it is to be understood that additional turns may be utilized without departing from the invention. Where a large number of apertures are utilized in each core, the apertures must be sufficiently spaced so as to reduce interference therebetween where the direction of the flux of an adjacent aperture is switched. Such interference can be substantially reduced by utilizing figure 8 windings as indicated in FIG. 10. The figure 8 type winding localizes the flux adjacent thereto and thus minimizes the influence of the local flux pattern adjacent one winding with the pattern adjacent another winding.

While there has been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic flux path comprising material capable of assuming either of two remanent states, said material having a central aperture and a plurality of secondary apertures, a plurality of first input windings respectively positioned through the different secondary apertures throughout said material for establishing a first remanent state thereat, a plurality of second input windings each positioned through one of said secondary apertures for establishing a second remanent state thereat, a plurality of output windings each positioned through one of said secondary aperatures for manifesting a change in the remanent state thereof, first selection means including a first selection winding positioned through the central aperture of said path for establishing a uniform remanent state therein thereby inhibiting the effectiveness of all said input windings, second selection means including a second selection winding positioned through one of the secondary apertures of said path, said core responsive only to the conjoint energization of both said first and second selection winding for altering the uniform remanent state of said path to thereby enable all said input windings.

2. Switching apparatus for selectively manifesting one or more input signals at one or more output terminals comprising: a plurality of magnetic cores arranged in columns and rows; first winding means coupled to each core of a given column for establishing a first remanent state in each core of said column; a second winding means coupled to each core of a given row for altering said first state to a second state to select a predetermined core by conjoint operation with said first winding means; third winding means coupled to a portion of each core of said row and responsive to an input pulse to produce a flux reversal in said portion of the selected core including means for re-establishing said second state; and sensing means coupled to said portion of each core of said column for manifesting an output signal representative of an input signal.

3. The invention as claimed in claim 2 wherein each said core defines a plurality of apertures, wherein said first, second and third winding means respectively embrace first, second and third apertures of each core of the associated rows and columns.

4. The invention as claimed in claim 2 wherein a plurality of additional winding means similar to said third winding means are provided, each said additional winding means embracing separate portions of each core of said row to provide a plurality of input channels, and a like plurality of additional sensing means respectively embracing said separate portions of each core of said column to provide a plurality of output channels, whereby signals applied to said input channels are selectively switchable to said output channels.

5. A switching matrix for switching signals between a plurality of input and output terminals comprising a plurality of magnetic cores arranged in columns and rows; each core having a plurality of apertures and comprising material capable of assuming either of two remanent states, each core having first and second means coupled thereto for controlling the remanent state thereof, each core having a plurality of input means coupled to a plurality of locations defined by the material of said core adjacent each said aperture of said core for respectively controlling the remanent state of said material adjacent each said location, each core having a plurality of output means respectively coupled to each said location for manifesting an alteration of the remanent state thereat; first circuit means associated with each column and intercoupling each said first means of the cores of said column for selecting said column; second circuit means associated with each row and intercoupling each said second means of the cores of said row for selecting said row, whereby the conjoint energization of predetermined first and second circuit means selects predetermined cores by establishing a predetermined flux pattern in each selected core; means intercoupling corresponding ones of said input means of the cores of each row to an input terminal; and means intercoupling corresponding ones of said output means of the cores of each column to an output terminal, whereby signals applied to said input terminals can be selectively manifested at said output terminals in accordance with selection of predetermined cores of said matrix.

6. A switching and storage matrix comprising the combination of a plurality of magnetic cores, each of said cores comprising material having two remanent states and defining a plurality of apertures, each core having at least first, second and third input windings, said first and second input windings embracing separate apertures of said core and effective only when coincidentally energized to switch said core from a first remanent condition wherein all the flux in said core is substantially oriented in the same direction to a second remanent condition with flux oriented in opposite directions in said core, each of said third input windings embracing an additional aperture of said core and effective when energized to cause a flux reversal adjacent said additional aperture only when said core exhibits said second remanent state; first means interconnecting said first input windings of first predetermined groups of cores; second means interconnecting said second input windings of second predetermined groups of cores, where the conjoint energization of said first and second means selects certain cores by establishing therein said second remanent state; and means interconnecting said third input windings of predetermined groups of cores for causing said flux reversal only in said selected cores.

7. A magnetic core for storing a plurality of binary digits comprising material capable of assuming first and second remanent states, said core having a plurality of dispersed apertures and a like plurality of storage locations defined by the material of said core adjacent said apertures, first means coupled to each location for establishing a first remanent state in the material adjacent thereto to represent the storage of a first binary digit, second means coupled to each said location for manifesting an alteration of the remanent state thereat, third means coupled to each said location for restoring said material adjacent thereto to a second remanent state thereby inducing a representation of the stored binary digit in said second means, a first selection winding linking a predetermined portion of said core, a second selection winding linking a part of said predetermined portion of said core, said core responsive to the energization of first selection winding to establish a uniform remanent state therein, said core further responsive to the conjoint energization of said first selection winding and said second selection winding to alter the uniform remanent state of said core whereby each of said first and third means is effective when energized to alter the remanent state at preselected locations.

8. A magnetic switching and storage device comprising a magnetic core having a plurality of apertures and made of material exhibiting opposite remanent stable states, a first winding threaded through a first aperture, a second winding threaded through a second aperture, said core responsive to the energization of said first winding in one sense to establish a uniform remanent flux orientation in said core, said core further responsive to the conjoint energization of both said first winding and said second winding in the same sense to establish a first flux pattern around the second aperture and a second flux pattern around all remaining apertures whereby said core is established in a selected condition, a plurality of windings threaded through a remaining one of said plurality of apertures for establishing a remanent flux pattern around said one remaining aperture to thereby store the representation of a binary digit therein and for thereafter reversing said flux pattern around said remaining one of said apertures to thereby read out the representation of said binary digit.

References Cited in the file of this patent

UNITED STATES PATENTS 2,818,555 Lo ---------------- Dec. 31, 1957
2,898,581 Post -------------- Aug. 4, 1959

FOREIGN PATENTS 760,048 Great Britain ---------- Oct. 31, 1956

OTHER REFERENCES

"The Transfluxor" by Rajchman and A. W. Lo, Proceedings of the IRE, vol. 44, issue 3, pp. 321–332, March 1956.